United States Patent
Hirono

(10) Patent No.: US 9,143,067 B2
(45) Date of Patent: Sep. 22, 2015

(54) MOTOR CONTROL DEVICE

(75) Inventor: Daisuke Hirono, Isesaki (JP)

(73) Assignee: SANDEN CORPORATION, Gunma (JP)

( * ) Notice: Subject to any disclaimer, the term of this patent is extended or adjusted under 35 U.S.C. 154(b) by 0 days.

(21) Appl. No.: 13/985,855

(22) PCT Filed: Feb. 8, 2012

(86) PCT No.: PCT/JP2012/052848
§ 371 (c)(1),
(2), (4) Date: Aug. 15, 2013

(87) PCT Pub. No.: WO2012/111505
PCT Pub. Date: Aug. 23, 2012

(65) Prior Publication Data
US 2013/0314016 A1   Nov. 28, 2013

(30) Foreign Application Priority Data

Feb. 15, 2011   (JP) .................................. 2011-029814

(51) Int. Cl.
*H02P 21/00* (2006.01)
*H02P 6/18* (2006.01)
*H02P 27/08* (2006.01)

(52) U.S. Cl.
CPC .............. *H02P 6/18* (2013.01); *H02P 21/0042* (2013.01); *H02P 27/08* (2013.01)

(58) Field of Classification Search
USPC ...................... 318/400.02, 727, 800, 801, 802
See application file for complete search history.

(56) References Cited

U.S. PATENT DOCUMENTS

| | | | |
|---|---|---|---|
| 6,462,491 B1 | 10/2002 | Iijima et al. | |
| 7,348,749 B2 * | 3/2008 | Ide et al. | 318/599 |
| 7,728,537 B2 * | 6/2010 | Tomigashi | 318/400.02 |
| 2009/0058334 A1 * | 3/2009 | Yamamoto | 318/400.02 |
| 2009/0237015 A1 * | 9/2009 | Hashimoto et al. | 318/400.02 |
| 2010/0308757 A1 * | 12/2010 | Ide et al. | 318/400.02 |

FOREIGN PATENT DOCUMENTS

| | | |
|---|---|---|
| CN | 1264212 | 8/2000 |
| JP | 2001-161090 | 6/2001 |
| JP | 2004-297901 | 10/2004 |
| JP | 2009-95135 | 4/2009 |
| JP | 2009-278828 | 11/2009 |
| JP | 2011-4515 | 1/2011 |

* cited by examiner

*Primary Examiner* — Rina Duda
(74) *Attorney, Agent, or Firm* — Cozen O'Connor

(57) ABSTRACT

A motor control device includes a feed-forward control unit configured to detect a change amount of any one of the target voltage, the applied voltage peak value, and the revolution number difference, which are a monitoring target. The control unit is also configured to manipulate an operation amount of a predetermined operation target on the basis of a magnitude of the change amount to correct the number of revolutions of the motor recognized by a controller.

4 Claims, 8 Drawing Sheets

US 9,143,067 B2

MOTOR CONTROL DEVICE

RELATED APPLICATIONS

This is a U.S. national stage of International application No. PCT/JP2012/052848 filed on Feb. 8, 2012.

This application claims the priority of Japanese application no. 2011-029814 filed Feb. 15, 2011, the entire content of which is hereby incorporated by reference.

TECHNICAL FIELD

The present invention relates to a motor control device, and more particularly, to a motor control device that variably controls the speed of a permanent magnetic synchronous motor through sensorless control.

BACKGROUND ART

As a motor having high efficiency and a wide variable speed range, a permanent magnetic synchronous motor (PMSM), in particular, an interior permanent magnetic synchronous motor (IPMSM) in which a permanent magnet is embedded in a rotor has found extensive applications such as a compressor driving motor of an air conditioner for vehicle and a drive motor for electric automobile. Demand for the motor is expected.

A motor control device that controls driving of the motor of this type is composed of a motor, an inverter, a direct-current power supply, and a controller incorporating a microcomputer. In the motor, it is a common practice to use so-called sensorless control, which includes detecting an induced voltage of the motor from, for example, information concerning an electric current and a voltage detected by a controller and effectively detecting a rotor position θm to control the motor without using a physical sensor.

Concerning the sensorless control, there is disclosed a technique for periodically detecting a rotor position change amount Δθm using the detected rotor position θm, applying a predetermined filter to a value obtained by time-differentiating the rotor position change amount Δθm to calculate the number of revolutions ω of the rotor, i.e., the motor, setting a target voltage phase using the calculated number of revolutions ω, and calculating an inverter output frequency ω (the number of revolutions) using the rotor position change amount Δθm (see, for example, Patent Literature 1).

CITATION LIST

Patent Literature

Patent Literature 1: Japanese Patent No. 3454210

SUMMARY OF INVENTION

Technical Problem

Incidentally, when a motor control device is used for, for example, driving an electric compressor mounted on a vehicle, and if a voltage applied from a direct-current power supply to an inverter suddenly fluctuates because of some reason or if the rotation of a motor suddenly fluctuates in association with the engine speed of the vehicle, a target voltage phase and an output voltage actually applied to the motor may also be subjected to a sudden fluctuation and the number of revolutions of the motor suddenly decreases or suddenly increases.

On the other hand, a time constant of a filter used for detection of the number of revolutions of the motor is set according to motor characteristics such as an inductance L and winding resistance R of the motor. In particular, when sensorless control is implemented, as described in the related art, a relatively large value enough for sufficiently removing noise of data is set. In other words, a relatively heavy filter is used. Therefore, the number of revolutions of the motor is recognized by a controller with a delay equivalent to the time constant after the motor actually rotates at the number of revolutions.

However, whereas the number of revolutions recognized by the controller is a parameter directly related to motor revolution number control, the target voltage phase and the output voltage are parameters not directly used for detection of the number of revolutions of the motor. Therefore, the target voltage phase and the output voltage are disturbance elements. Therefore, if the motor is suddenly accelerated or suddenly decelerated because the target voltage phase and the output voltage suddenly fluctuate during the sensorless control, a marked response delay occurs in the motor revolution number control due to the presence of the heavy filter. Such a response delay may disable the sensorless control of the motor and cause the motor to step out and, in addition, cause a serious hindrance in stable operation of a compressor driven by the motor.

The present invention has been devised in view of such problems and it is an object of the present invention to provide a motor control device that can improve stability of the sensorless control of the permanent magnetic synchronous motor.

SUMMARY

In order to attain an object, a motor control device according to the present invention is a motor control device that detects a rotor position of a permanent magnetic synchronous motor through sensorless control in a controller, the motor control device including: current detecting means for detecting an electric current flowing through a coil of the motor; applied voltage detecting means for detecting a voltage applied to the coil of the motor; rotor position detecting means for detecting the rotor position on the basis of the electric current detected by the current detecting means and the voltage detected by the applied voltage detecting means; target current phase setting means for setting a target current on the basis of the rotor position detected by the rotor position detecting means; revolution number detecting means for detecting the number of revolutions of the motor on the basis of the rotor position detected by the rotor position detecting means; phase voltage setting means for setting a target voltage on the basis of the electric current detected by the current detecting means, the rotor position detected by the rotor position detecting means, and the number of revolutions detected by the revolution number detecting means; and feed-forward control means for detecting a change amount of a predetermined monitoring target, which is used for changing the number of revolutions of the motor without depending on the revolution number detecting means, and correcting the number of revolutions recognized by the controller.

Specifically, the monitoring target is any one of the target voltage detected by the phase voltage setting means and a target number of revolutions transmitted from the outside.

The operation target is any one of the number of revolutions detected by the revolution number detecting means and the target current (Idt) set by the target current setting means.

Further, specifically, the feed-forward control means detects a change amount of the monitoring target, converts the change amount into an actual revolution number difference of the motor, filters the actual revolution number difference with a filter of a response time constant, which takes into account the inertia of the rotor, to detect an added revolution number difference, and adds the added revolution number difference to the number of revolutions detected by the revolution number detecting means.

DETAILED DESCRIPTION

The motor control device includes the feed-forward control means for detecting a change amount of a predetermined monitoring target, which is used for changing the number of revolutions of the motor without depending on the revolution number detecting means, and correcting the number of revolutions of the motor recognized by the controller. Consequently, even if a disturbance element for detection of the number of revolutions of the motor suddenly fluctuates, the number of revolutions of the motor recognized by the controller can be corrected to quickly follow an actual number of revolutions. Therefore, it is possible to reduce a response delay in the motor revolution number control and improve stability of sensorless control for the motor.

In various embodiments, if the monitoring target of the feed-forward control means is set to any one of the target voltage and the target number of revolutions, which are disturbance elements for the detection of the number of revolutions of the motor, even if the target voltage and the target number of revolutions suddenly fluctuate, the number of revolutions of the motor recognized by the controller can be surely corrected to quickly follow the actual number of revolutions. Therefore, it is possible to preferably surely improve stability of the sensorless control for the motor.

In various embodiments, if the operation target of the feed-forward control means is set to any one of the number of revolutions and the target current, even if a disturbance element, which is the monitoring target, suddenly fluctuates, the number of revolutions of the motor recognized by the controller can be surely corrected to quickly follow the actual number of revolutions. Therefore, it is possible to preferably surely improve stability of the sensorless control for the motor.

In one embodiment, specifically, the feed-forward control means detects a change amount of the monitoring target, converts the change amount into an actual revolution number difference of the motor, filters the actual revolution number difference with a filter of a response time constant, which takes into account the inertia of the rotor, to detect an added revolution number difference, and adds the added revolution number difference to the number of revolutions detected by the revolution number detecting means. Therefore, it is possible to surely correct the number of revolutions of the motor recognized by the controller to quickly follow the actual number of revolutions.

DESCRIPTION OF EMBODIMENTS

Figure 1:
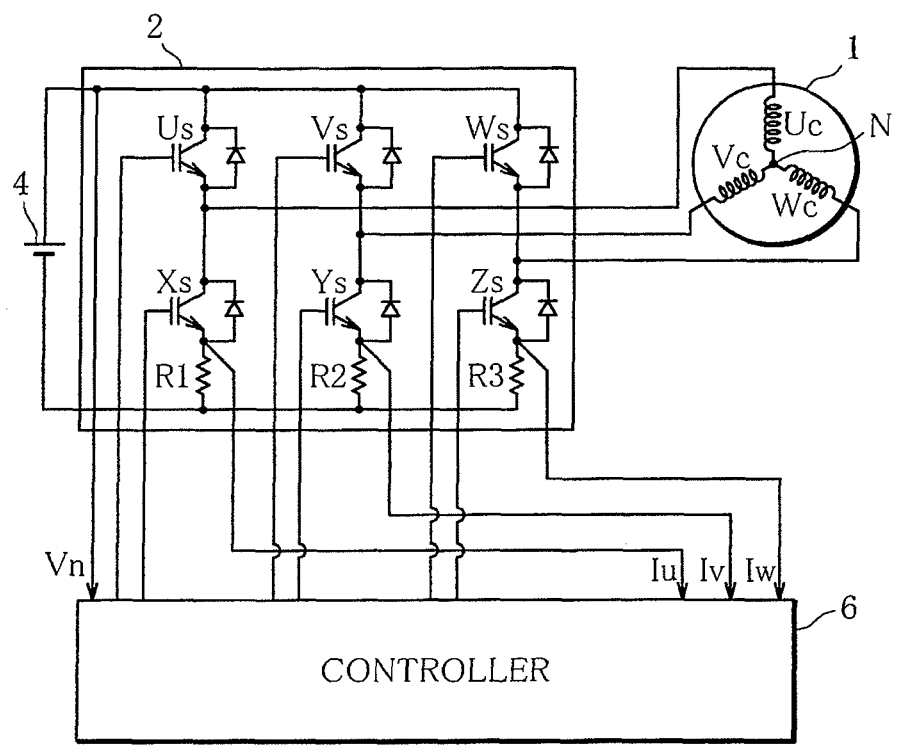
FIG. 1 is a configuration diagram of a motor control device according to a first embodiment of the present invention.

FIG. 1 is a configuration diagram of a motor control device according to a first embodiment of the present invention. The motor control device is configured from a motor 1, an inverter 2, a direct-current power supply 4, and a controller 6 incorporating a microcomputer.

Figure 2:
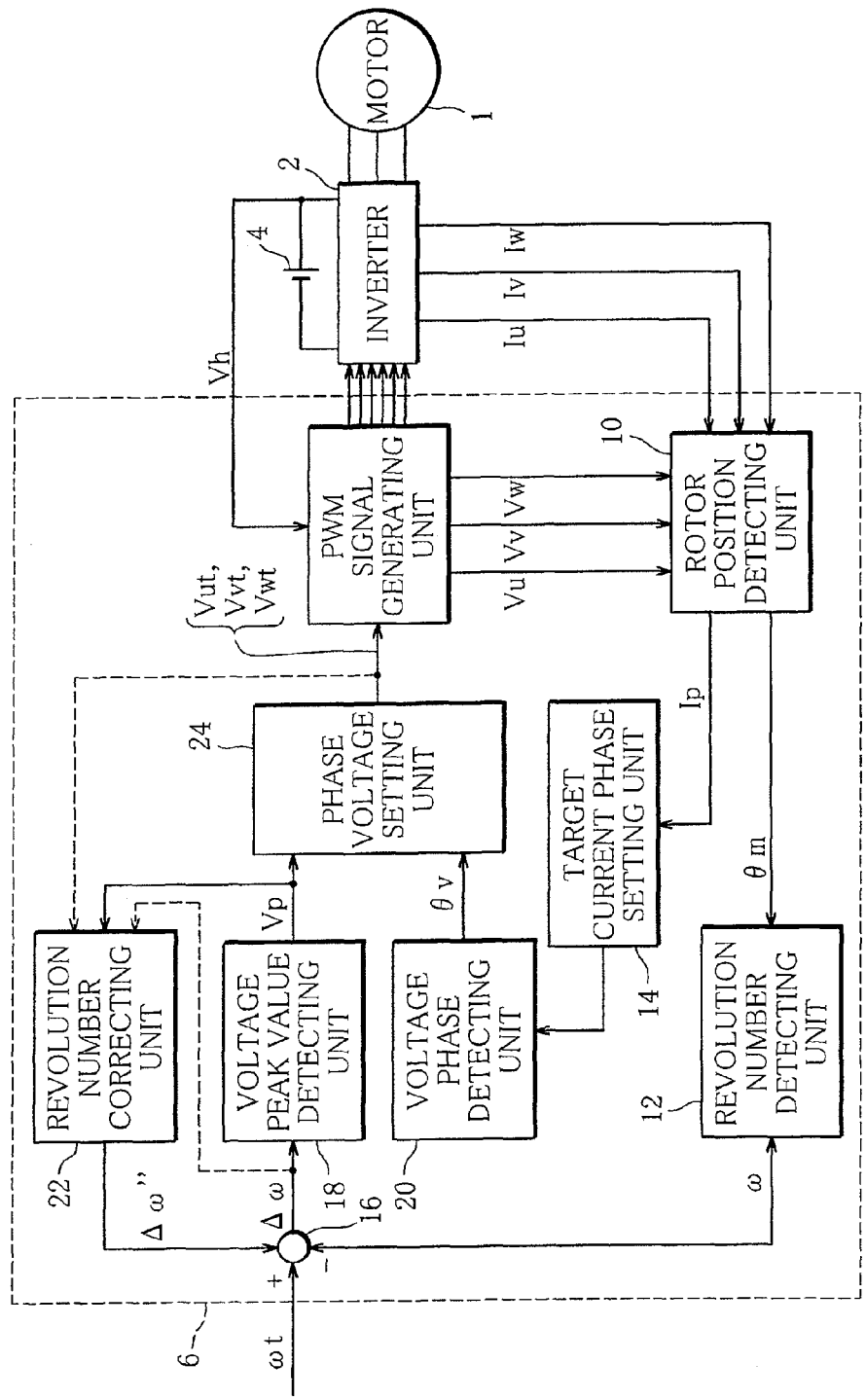
FIG. 2 is a control block diagram showing sensorless control performed by a controller shown in FIG. 1.

FIG. 2 is a control block diagram showing sensorless control of the motor 1 performed by the controller 6. The controller 6 includes a PWM signal generating unit 8, a rotor position detecting unit (rotor position detecting means) 10, a revolution number detecting unit (revolution number detecting means) 12, a target current phase setting unit (target current phase setting means) 14, an adder 16, a voltage peak value detecting unit (voltage peak value detecting unit) 18, a voltage phase detecting unit 20, a revolution number correcting unit (feed-forward control means) 22, and a phase voltage setting unit (phase voltage setting means) 24.

The motor 1 is a three-phase blushless DC motor. The motor 1 includes a not-shown stator including coils of three phases (a U-phase coil Uc, a V-phase coil Vc, and a W-phase coil Wc) and a not-shown rotor including a permanent magnet. The U-phase coil Uc, the V-phase coil Vc, and the W-phase coil Wc are connected in a star shape centering on a neutral point N as shown in FIG. 1 or connected in a delta shape.

The inverter 2 is a three-phase bipolar driving type inverter. The inverter 2 includes switching elements of three phases corresponding to the coils of the three phases of the motor 1, specifically, six switching elements (upper-phase switching elements Us, Vs, and Ws and lower-phase switching elements Xs, Ys, and Zs) consisting of IGBT or the like and shunt resistors R1, R2, and R3.

The upper-phase switching element Us, the lower-phase switching element Xs, the shunt resistor R1, the upper-phase switching element Vs, the lower-phase switching element Ys, the shunt resistor R2, the upper-phase switching element Ws, the lower-phase switching element Zs, and the shunt resistor R3 are connected in series to one another. Output terminals of the direct-current power supply 4, which generates a high voltage Vh, are connected in parallel to both ends of respective series connection lines for these devices.

An emitter side of the upper-phase switching element Us is connected to the U-phase coil Uc of the motor 1. An emitter side of the upper-phase switching element Vs is connected to the V-phase coil Vc of the motor 1. An emitter side of the upper-phase switching element Ws is connected to the V-phase coil Wc of the motor 1.

Further, gates of the upper-phase switching elements Us, Vs, and Ws, gates of the lower-phase switching elements Xs, Ys, and Zs, and a secondary side output terminal of the direct-current power supply 4 are respectively connected to the PWM signal generating unit 8. Further, the lower-phase switching element Xs side of the shunt resistor R1, the lower-phase switching element Ys side of the shunt resistor R2, and the lower-phase switching element Zs side of the shunt resistor R3 are respectively connected to the rotor position detecting unit 10.

The inverter 2 detects, using voltages respectively detected by the shunt resistors R1, R2, and R3, electric currents (a U-phase current Iu, a V-phase current Iv, and a W-phase current Iw) flowing through the U-phase coil Uc, the V-phase coil Vc, and the W-phase coil Wc of the motor 1 (current detecting means) and sends the electric currents to the rotor position detecting unit 10.

The PWM signal generating unit 8 detects a high voltage Vh of the direct-current power supply 4, generates, on the basis of the high voltage Vh and a phase voltage set by the phase-voltage setting unit 24, a PWM signal for turning on and off the respective switching elements in the gates of the upper-phase switching elements Us, Vs, and Ws and the gates of the lower-phase switching elements Xs, Ys, and Zs of the inverter 2, and sends the PWM signal to the inverter 2.

The upper-phase switching elements Us, Vs, and Ws and the lower-phase switching elements Xs, Ys, and Zs of the inverter 2 are turned on and off in a predetermined pattern according to the PWM signal from the PWM signal generating unit 8 and apply sine wave energization (180 degree energization) based on this ON/OFF pattern to the U-phase coil Uc, the V-phase coil Vc, and the W-phase coil Wc of the motor 1.

The PWM signal generating unit 8 is connected to the rotor position detecting unit 10. The PWM signal generating unit 8 detects, using the high voltage Vh of the direct-current power supply 4 detected by the PWM signal generating unit 8, voltages (a U-phase applied voltage Vu, a V-phase applied voltage Vv, and a W-phase applied voltage Vw) applied to the U-phase coil Uc, the V-phase coil Vc, and the W-phase coil Wc of the motor 1 (applied voltage detecting means) and sends the voltages to the rotor position detecting unit 10.

The rotor position detecting unit 10 detects, using the U-phase current Iu, the V-phase current Iv, and the W-phase current Iw sent from the inverter 2 and the U-phase applied voltage Vu, the V-phase applied voltage Vv, and the W-phase applied voltage Vw sent from the PWM signal generating unit 8, an induced voltage peak value Ep (an induced voltage phase), an induced voltage electric angle θe (an induced voltage phase), a phase current peak value Ip (a current phase), and a phase current electric angle θi (a current phase).

Figure 3:
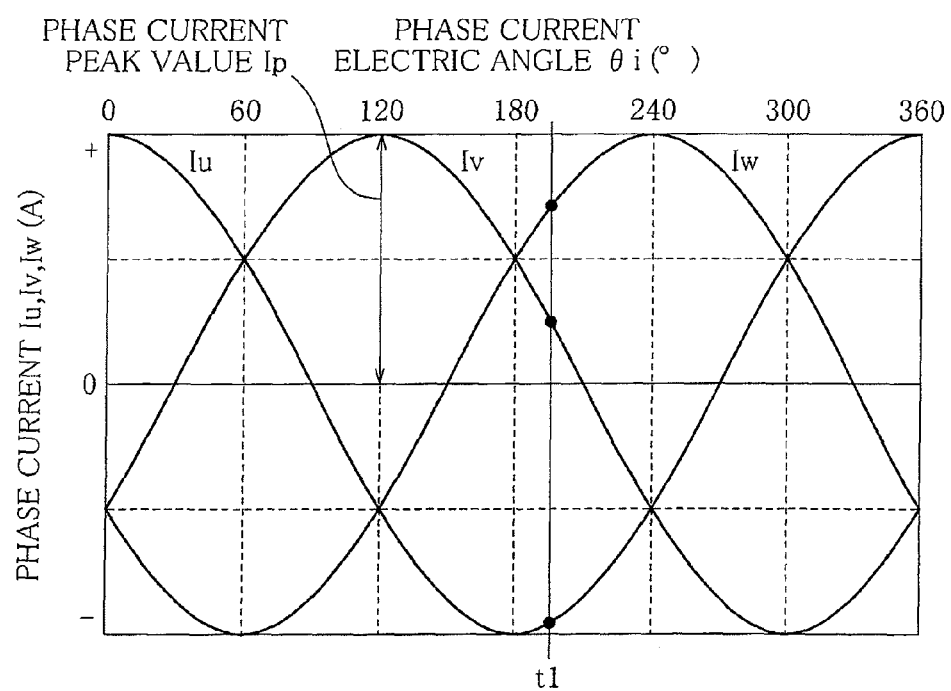
FIG. 3 is a phase current waveform chart at the time when sine wave energization (180° energization) is applied to a U-phase coil Uc, a V-phase coil Vc, and a W-phase coil Wc of the motor shown in FIG. 2.

Specifically, referring to a phase current waveform chart of FIG. 3 at the time when sine wave energization (180° energization) is applied to the U-phase coil Uc, the V-phase coil Vc, and the W-phase coil Wc of the motor 1, the U-phase current Iu, the V-phase current Iv, and the W-phase current Iw forming a sine waveform respectively have a phase difference of 120°.

From the phase current waveform chart, the following expressions hold between the U-phase current Iu, the V-phase current Iv, and the W-phase current Iw and the phase current peak value Ip and the phase current electric angle θi:

$$Iu = Ip \times \cos(\theta i)$$

$$Iv = Ip \times \cos(\theta i - \tfrac{2}{3}\pi)$$

$$Iw = Ip \times \cos(\theta i + \tfrac{2}{3}\pi)$$

The detection of the phase current peak value Ip and the phase current electric angle θi in the rotor position detecting unit 10 is performed on the premise that the expressions hold. The phase current peak value Ip and the phase current electric angle θi are calculated by a calculation of the expressions using the U-phase current Iu, the V-phase current Iv, and the W-phase current Iw sent from the inverter 2.

Figure 4:
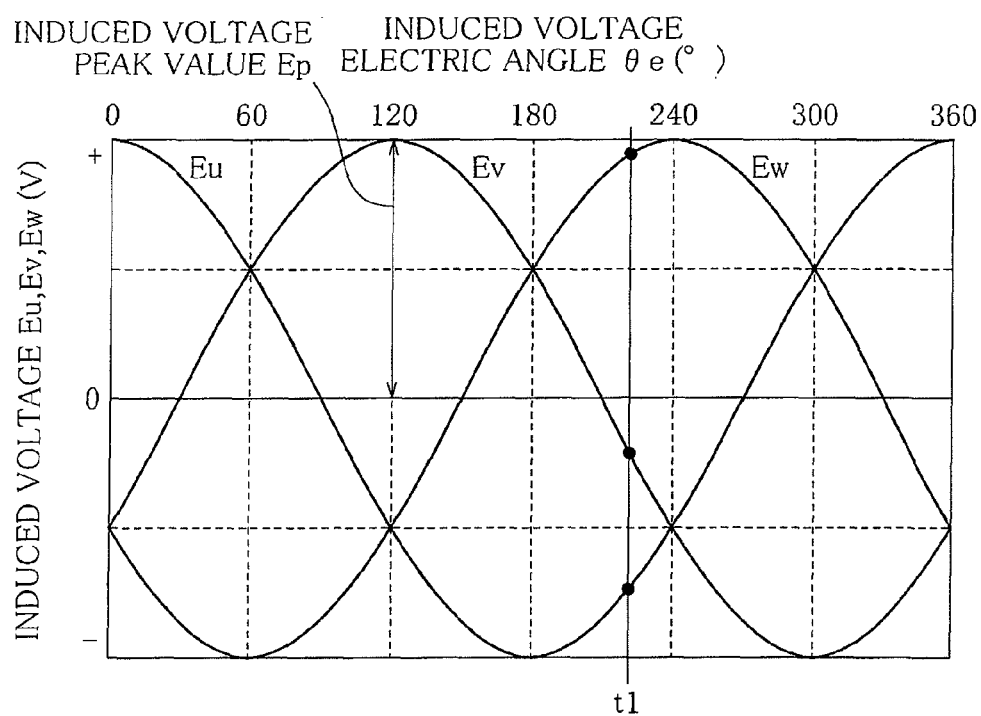
FIG. 4 is an induced voltage waveform chart at the time when the sine wave energization (180° energization) is applied to the U-phase coil Uc, the V-phase coil Vc, and the W-phase coil Wc of the motor shown in FIG. 2.

On the other hand, referring to the induced voltage waveform chart of FIG. 4 at the time when sine wave energization (180° energization) is applied to the U-phase coil Uc, the V-phase coil Vc, and the W-phase coil Wc of the motor 1, a U-phase induced voltage Eu, a V-phase induced voltage Ev, a the W-phase induced voltage Ew forming a sine waveform respectively have a phase difference of 120°.

From the induced voltage waveform chart, the following expressions hold between the U-phase induced voltage Eu, the V-phase induced voltage Ev, and the W-phase induced voltage Ew and the induced voltage peak value Ep and the induced voltage electric angle θe:

$$Eu = Ep \times \cos(\theta e)$$

$$Ev = Ep \times \cos(\theta e - \tfrac{2}{3}\pi)$$

$$Ew = Ep \times \cos(\theta e + \tfrac{2}{3}\pi)$$

The following expressions hold among the U-phase applied voltage Vu, the V-phase applied voltage Vv, and the W-phase applied voltage Vw, the U-phase current Iu, the V-phase current Iv, and the W-phase current Iw, U-phase coil resistance Ru, V-phase coil resistance Rv, and W-phase coil resistance Rw, and the U-phase induced voltage Eu, the V-phase induced voltage Ev, and the W-phase induced voltage Ew:

$$Vu - Iu \times Ru = Eu$$

$$Vv - Iv \times Rv = Ev$$

$$Vw - Iw \times Rw = Ew$$

The detection of the induced voltage peak value Ep and the induced voltage electric angle θe in the rotor position detecting unit 10 is performed on the premise that the expressions hold. The U-phase induced voltage Eu, the V-phase induced voltage Ev, and the W-phase induced voltage Ew are calculated from the expression (the latter expression) using the U-phase current Iu, the V-phase current Iv, and the W-phase current Iw sent from the inverter 2 and the U-phase applied voltage Vu, the V-phase applied voltage Vv, and the W-phase applied voltage Vw sent from the PWM signal generating unit 8. The induced voltage peak value Ep and the induced voltage electric angle θe are calculated from the expression (the former expression) using the calculated U-phase induced voltage Eu, V-phase induced voltage Ev, and W-phase induced voltage Ew.

The rotor position detecting unit 10 detects a rotor position θm from the following expression using the phase current electric angle θi detected here and a current phase β selected from a data table explained below prepared in advance:

$$\theta m = \theta i - \beta - 90°$$

Sensorless control not by a physical sensor is performed in the rotor position detecting unit 10.

The data table used here defines the current phase β using [phase current peak value Ip] and [induced voltage electric angle θe−phase current electric angle θi] as parameters. The expected current phase β can be selected using [phase current peak value Ip] and [induced voltage electric angle θe−phase current electric angle θi] as parameters. Note that the phase current peak value Ip detected by the rotor position detecting unit 10 corresponds to [phase current peak value Ip]. A value obtained by subtracting the phase current electric angle θi from the induced voltage electric angle θe detected by the rotor position detecting unit 10 corresponds to [induced voltage electric angle θe−phase current electric angle θi].

Figure 5:
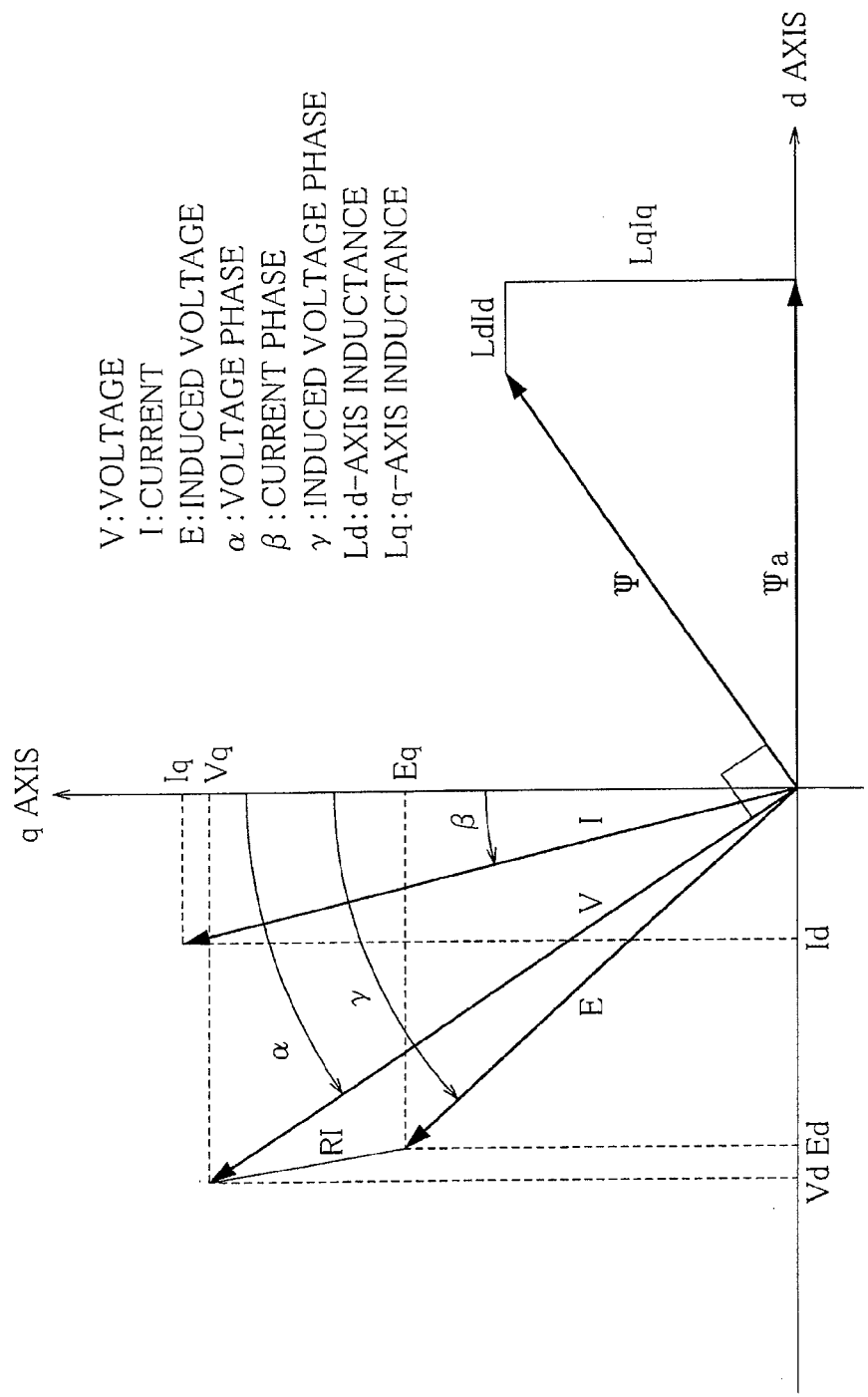
FIG. 5 is a motor vector diagram at the time when a rotor of the motor shown in FIG. 2 is rotating.

FIG. 5 is a motor vector diagram at the time when the rotor of the motor 1 is rotating. A relation among a voltage V, an electric current I, and an induced voltage E (=ωΨ) is represented as vectors on the d-q-axis coordinate. In the figure, Vd represents a d-axis component of the voltage V, Vq represents a q-axis component of the voltage V, Id represents a d-axis component (a d-axis current) of the electric current I, Iq represents a q-axis component (a q-axis current) of the electric current I, Ed represents a d-axis component of the induced voltage E, Eq represents a q-axis component of the induced voltage E, α represents a voltage phase based on the q axis, β represents a current phase based on the q axis, and γ represents an induced voltage phase based on the q axis. In the figure, Ψa represents a magnetic flux of a permanent magnet of the rotor, Ld represents d-axis inductance, Lq represents q-axis inductance, R represents winding resistance of the stator, and Ψ represents a total flux linkage of the rotor.

From the motor vector diagram, when the number of revolutions of the rotor is represented as ω, the following expression holds:

$$\begin{pmatrix} Vd \\ Vq \end{pmatrix} = \begin{pmatrix} R & -\omega Lq \\ \omega Ld & R \end{pmatrix} \begin{pmatrix} Id \\ Iq \end{pmatrix} + \begin{pmatrix} 0 \\ \omega \Psi a \end{pmatrix} \quad \text{[Expression 1]}$$

When a value concerning ω is transferred from the right side to the left side of the expression, the following expression holds:

$$\begin{pmatrix} Ed/\omega = (Vd - Id \times R)/\omega \\ Eq/\omega = (Vq - Iq \times R)/\omega \end{pmatrix} = \begin{pmatrix} 0 & -Lq \\ Ld & 0 \end{pmatrix} \begin{pmatrix} Id \\ Iq \end{pmatrix} + \begin{pmatrix} 0 \\ \Psi a \end{pmatrix} \quad \text{[Expression 2]}$$

The generation of the data table used in detecting the rotor position θm in the rotor position detecting unit 10 is performed on the premise that the expressions hold under the motor vector diagram. The current phase β at the time when [induced voltage phase γ−current phase β] is a predetermined value is stored while the current phase β and the electric current I shown in the motor vector diagram are respectively increased stepwise in predetermined ranges. The data table of the current phase β including [phase current peak value Ip] equivalent to [electric current I] and [induced voltage electric angle θe−phase current electric angle θi] equivalent to [induced voltage phase γ−current phase β] as parameters is generated. The rotor position θm detected by the rotor position detecting unit 10 using the generated data table is sent to the revolution number detecting unit 12. The phase current peak value Ip detected by the rotor position detecting unit 10 using the data table is sent to the target current phase setting unit 14.

The revolution number detecting unit 12 calculates a rotor position change amount Δθm using the rotor position θm, which is detected by the rotor position detecting unit 10, by subtracting a rotor position θm−1, a calculation cycle of which is one cycle before a calculation cycle of the rotor position θm, from the rotor position θm. The revolution number detecting unit 12 applies a predetermined filter to the rotor position change amount Δθm to detect the number of revolutions ω of the motor 1 and sends the number of revolutions ω to the adder 16. The revolution number detecting unit 12 feeds back the number of revolutions ω calculated by the revolution number detecting unit 12 to a target number of revolutions ωt of the motor 1, which is instructed to the controller 6, through the adder 16, and calculates a revolution number difference Δω (monitoring target, operation target) according to processing such as P control or PI control.

The voltage peak value detecting unit 18 detects an applied voltage peak value Vp (monitoring target) of a voltage applied to the motor 1 using the calculated revolution number difference Δω according to the processing such as the P control or the PI control and sends the applied voltage peak value Vp to the phase voltage setting unit 24.

The revolution number correcting unit 22 detects a voltage change amount ΔV as a change amount of the applied voltage peak value Vp detected by the voltage peak value detecting unit 18, detects, using the voltage change amount ΔV, an added revolution number difference Δω" according to a method explained below, feeds forward the added revolution number difference Δω" through the adder 16, sets, as a revolution number difference Δω, a value obtained by adding the added revolution number difference Δω" to a revolution number difference processed by the P control, the PI control, or the like explained above, and sends the revolution number difference Δω to the voltage peak value detecting unit 18.

The target current phase setting unit 14 sets a target current phase such that generated torque of the motor 1 with respect to a phase current is maximized by the current vector control referred to as the maximum torque/current control, for example. Specifically, the target current phase setting unit 14 sets a target d-axis current Idt using the phase current peak value Ip detected by the rotor position detecting unit 10, and a data table prepared in advance and sends the target d-axis current Idt to the voltage phase detecting unit 20.

The voltage phase detecting unit 20 detects an applied voltage phase θv (a target voltage phase) of a voltage applied to the motor 1 using the target d-axis current Idt set by the target current phase setting unit 14 and sends the applied voltage phase θv to the phase voltage setting unit 24.

The phase voltage setting unit 24 sets, using the applied voltage peak value Vp detected by the voltage peak value detecting unit 18 and the applied voltage phase θv detected by the voltage phase detecting unit 20, applied setting voltages (a U-phase applied setting voltage Vut, a V-phase applied setting voltage Vvt, and a W-phase applied setting voltage Vwt) to be applied to the U-phase coil Uc, the V-phase coil Vc, and the W-phase coil Wc of the motor 1 and sends the applied setting voltages to the PWM signal generating unit 8.

The PWM signal generating unit 8 applies, via the inverter 2, on the basis of an ON/OFF pattern of a PWM signal, sine wave energization (180 degree energization) to the U-phase coil Uc, the V-phase coil Vc, and the W-phase coil Wc of the motor 1 with the applied setting voltages set by the phase voltage setting unit 24. Consequently, the motor 1 is operated at a desired number of revolutions.

A method of detecting an added revolution number difference Δω" in the revolution number correcting unit 22 is explained more in detail below with reference to FIGS. 6 and 7.

Figure 6:
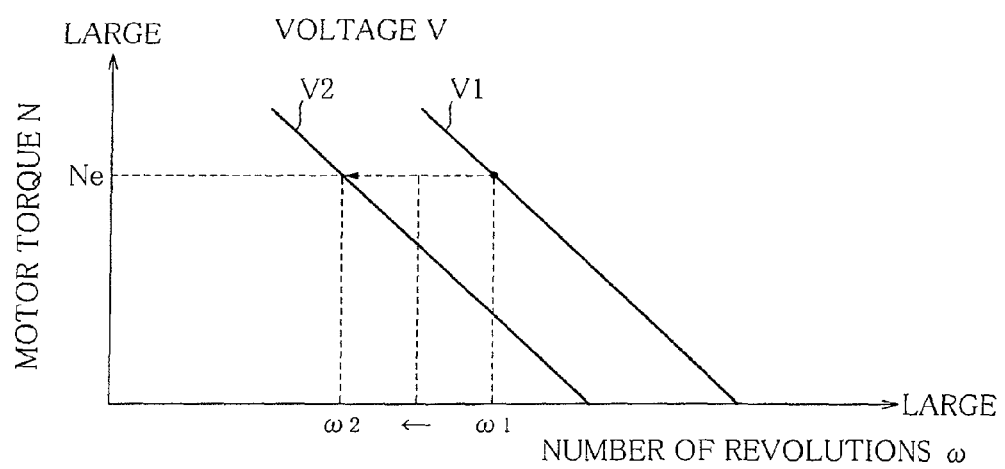
FIG. 6 is a diagram showing the number of revolutions $\omega$ with respect to motor torque N during fluctuation of an output voltage V of the motor.

FIG. 6 is a diagram showing the number of revolutions ω with respect to motor torque N during fluctuation of an output voltage V of the motor 1. FIG. 7 is a diagram showing, in time series, with respect to the fluctuation of the output voltage V, an actual number of revolutions ω', a recognized number of revolutions ω in the controller, an added revolution number difference Δω" calculated by the revolution number correcting unit, and a corrected number of revolutions ω" corrected by adding the added revolution number difference Δω" to the recognized number of revolutions ω in the revolution number correcting unit.

When the motor control device is used for, for example, driving of an electric compressor mounted on a vehicle, if a voltage applied from the direct-current power supply 4 to the inverter 2 suddenly fluctuates because of some reason or if the rotation of the motor 1 suddenly fluctuates in association with the engine speed of the vehicle, the applied output voltage V suddenly fluctuates.

Specifically, as shown in FIG. 6, when the voltage V suddenly fluctuates from V1 to V2 (V2<V1), the number of revolutions ω obtained when the motor torque N is fixed to Ne changes from ω1 to ω2 (ω2<ω1). At this point, taking into account the fact that inertia acts on the rotor because of the rotation of the rotor itself, when ω represents motor revolution number, α represents induced power element, β represents torque constant, and Tor represents torque, the following expression holds:

$$\omega = \alpha \cdot V - \beta \cdot \text{Tor} \quad (1)$$

When ω represents motor revolution number, Tor represents motor actual torque (motor output torque−load torque), J represents inertia, and Tor(O) represents load torque, the following expression holds:

$$\text{Tor} = J \cdot d\omega/dt + \text{Tor}(O) \quad (2)$$

When Expression (2) is substituted in Expression (1), the following expression holds:

$$\alpha V = \omega + \beta \cdot J \cdot d\omega/dt + \beta \cdot \text{Tor}(O) \quad (3)$$

Further, when Expression (3) is transformed, the following expression holds:

$$V = \omega/\alpha + \beta \cdot J/\alpha \cdot d\omega/dt + \beta/\alpha \cdot \text{Tor}(O) \quad (4)$$

Further, when a differential equation of Expression (4) is solved and Tw represents a response time constant of the number of revolutions ω, the following expression holds:

$$T\omega = \beta \cdot J \quad (5)$$

Here, for example, if J is 0.001 (kg·m) and β is 20 (rad/N·m), Tω=20 msec. In this case, as shown in FIG. 7, it is seen that a mechanical response delay of 20 msec due to motor characteristics occurs after the voltage V is changed until the recognized number of revolutions ω recognized by the motor 1 changes to ω2.

On the other hand, a time constant of a filter set by the revolution number detecting unit 12 is set according to motor characteristics such as inductance L and winding resistance R of the motor 1. In particular, when the sensorless control is performed, a relatively large value enough for sufficiently removing noise of data, for example, 10 msec is set.

Figure 7:
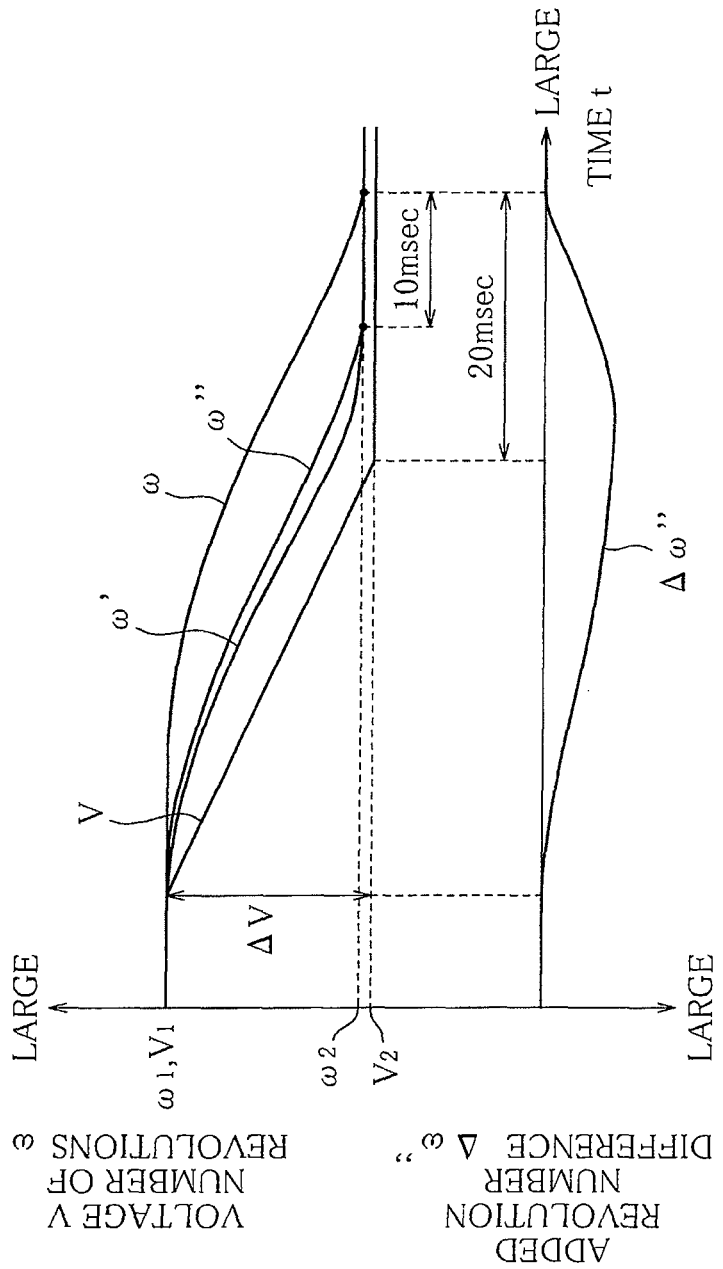
FIG. 7 is a diagram showing, in time series, an actual number of revolutions $\omega'$, a recognized number of revolutions $\omega$, an added revolution number difference $\Delta\omega''$, and a corrected number of revolutions $\omega''$ with respect to the fluctuation of the output voltage V.

That is, as shown in FIG. 7, a response delay of 10 msec occurs after the actual number of revolutions ω' of the motor 1 changes to ω2 until the ω2 is recognized by the controller 6 as the recognized number of revolutions ω.

A method of detecting the added revolution number difference Δω" in the revolution number correcting unit 22 is explained in detail below.

In the revolution number correcting unit 22, when ΔV represents a voltage change amount, α represents an induced voltage coefficient, and Δω' represents an actual revolution number difference and the torque of the motor 1 is assumed to be fixed, from Expression (4), the following expression holds:

$$\Delta\omega' = \alpha \cdot \Delta V \quad (6)$$

The added revolution number difference Δω" is calculated by the following expression by applying the [20 msec filter] for obtaining the response time constant Tω taking into account the inertia of the rotor to the actual revolution number difference Δω':

$$\Delta\omega'' = [20 \text{ msec filter}] \cdot \Delta\omega' \quad (7)$$

The added revolution number difference Δω" detected by the revolution number correcting unit 22 is in this way sent to the adder 16. The adder 16 performs correction for adding the added revolution number difference Δω" to the recognized revolution number difference Δω, which is a difference between the target number of revolutions ωt and the recognized number of revolutions ω, beforehand. The recognized number of revolutions ω is corrected to the corrected number of revolutions ω". Consequently, it is possible to eliminate the response delay after the actual number of revolutions of the motor 1 changes to ω' until the actual number of revolutions ω' is recognized by the controller 6 as the number of revolutions ω.

As explained above, in this embodiment, since the motor control device includes the revolution number correcting unit 22, even if the output voltage V, which is a disturbance element for detection of the number of revolutions of the motor 1, suddenly fluctuates, the recognized number of revolutions ω of the motor 1 can be corrected to quickly converge to the actual number of revolutions ω'. Therefore, it is possible to reduce a response delay in the motor revolution number control and improve stability of the sensorless control for the motor 1.

Next, the second embodiment of the present invention is explained.

Figure 8:
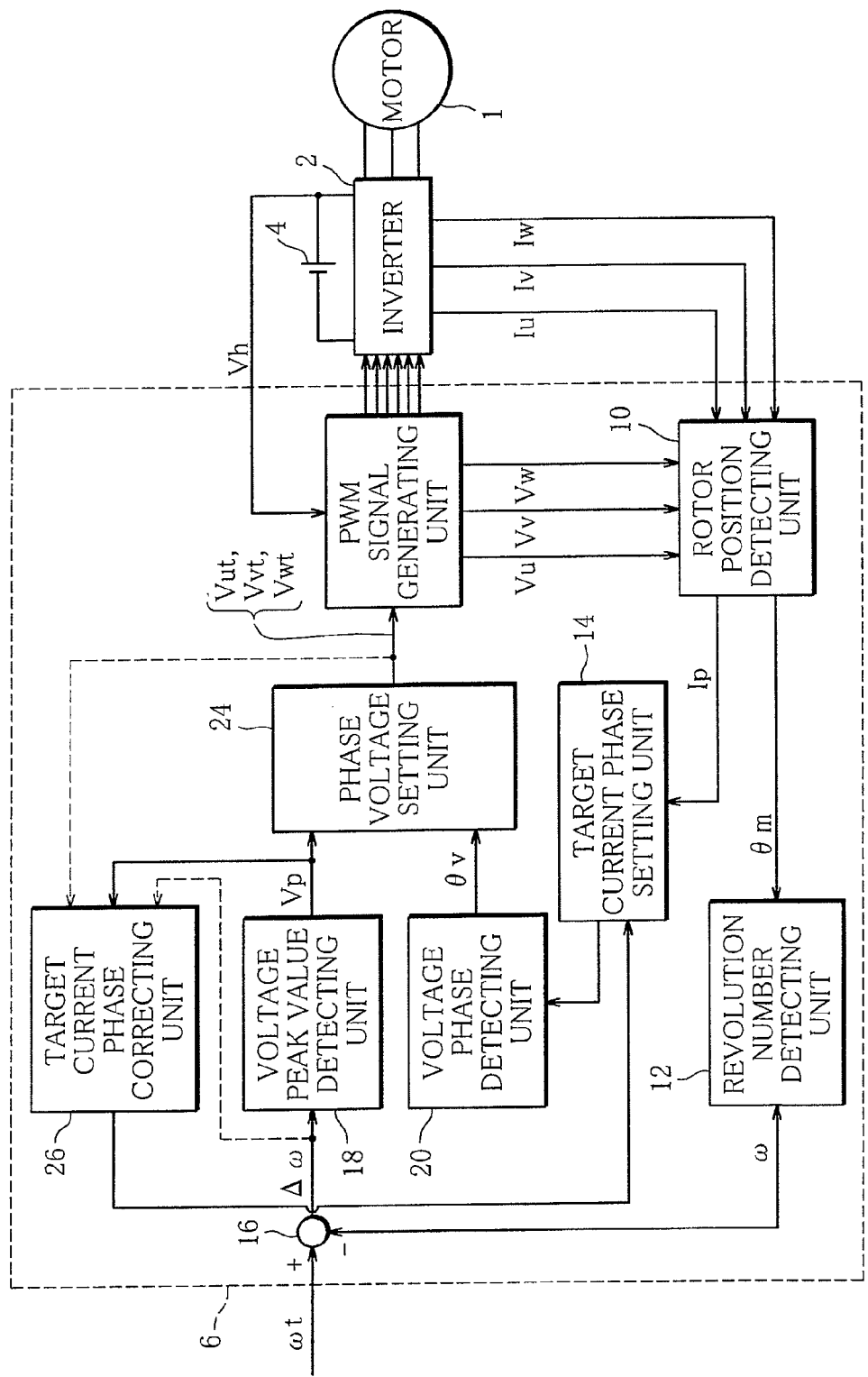
FIG. 8 is a control block diagram showing sensorless control performed by a controller of a motor control device according to a second embodiment of the present invention.

FIG. 8 is a control block diagram showing sensorless control performed by a controller of a motor control device according to this embodiment. Note that a basic configuration of the motor control device, a basic control method for the motor 1 and the like are the same as those in the first embodiment. Therefore, explanation of the basic configuration, the basic control method and the like is omitted.

In this embodiment, a target current phase correcting unit (feed-forward control means) 26 is provided instead of the revolution number correcting unit 22. The target current phase correcting unit 26 detects a voltage change amount ΔV as a change amount of the applied voltage peak value Vp detected by the voltage peak value detecting unit 18 and calculates an added current phase difference, specifically, an added d-axis current difference ΔId" corresponding to the magnitude of the voltage change amount ΔV.

The added d-axis current difference ΔId" detected by the target current phase correcting unit 26 is sent to the target current phase setting unit 14. As explained above, the target current phase setting unit 14 sets, as a target d-axis current Idt, a value obtained by adding the added d-axis current difference ΔId" to a d-axis current, which is a target current phase (an operation target) set using the phase current peak value Ip and the data table prepared in advance.

As explained above, in this embodiment, the target d-axis current Idt is changed instead of performing correction of the number of revolutions ω. Consequently, as in the case of the first embodiment, it is possible to eliminate the response delay of at least 10 msec after the actual number of revolutions of the motor 1 changes to ω' until the actual number of revolutions ω' is recognized by the controller 6 as the number of revolutions ω.

Therefore, since the motor control device includes the target current phase correcting unit 26, even if the output voltage V, which is a disturbance element for detection of the number of revolutions of the motor 1, suddenly fluctuates, the recognized number of revolutions ω of the motor 1 can be corrected to quickly follow the actual number of revolutions ω'. Therefore, it is possible to reduce a response delay in the motor revolution number control and improve stability of the sensorless control for the motor 1.

The embodiments of the present invention are explained above. However, the present invention is not limited to the embodiments and can be variously changed without departing from the spirit of the present invention.

For example, in the embodiments explained above, as the means for detecting fluctuation in the output voltage V, fluctuation in the applied voltage peak value Vp is monitored as explained above. However, the monitoring target is not limited to this. As another monitoring target that fluctuates generally in association with fluctuation in the output voltage V, as indicated by dotted lines in FIG. 2 and FIG. 8, applied setting voltages set by phase voltage phase setting unit 24 (a U-phase applied setting voltage Vut, a V-phase applied setting voltage Vvt, and a W-phase applied setting voltage Vwt) or the revolution number difference Δω output from the adder 16 is conceivable. The added revolution number difference Δω" and the added d-axis current difference ΔId" to be added may be calculated according to the magnitude of fluctuation in these parameters.

That is, if any one of the target d-axis current Idt, the applied voltage peak value Vp, and the revolution number difference Δω, which are disturbance elements for the detection of the number of revolutions of the motor 1, is set as a monitoring target of the revolution number correcting unit 22 and the target current phase correcting unit 26 functioning as the feed-forward control means, even if these values suddenly fluctuate, since the number of revolutions ω of the motor 1 recognized by the controller 6 can be corrected to quickly follow the actual number of revolutions ω', it is possible to surely improve stability of the sensorless control for the motor 1.

In the embodiments explained above, the three-phase blushless DC motor is illustrated as the motor 1 and the three-phase bipolar driving type inverter is explained as the inverter 2. However, the motor control device is not limited to this. If the motor control device is a motor control device including an inverter for a synchronous motor other than a three-phase inverter, it is possible to apply the present invention and obtain action and effects same as those explained above.

Further, if the motor control device according to the embodiments is applied to motor control for driving a compressor of an air conditioning device for a vehicle or applied to motor control for driving an electric automobile, it is possible to suitably reduce a response delay during fluctuation of the disturbance elements explained above and improve controllability of the compressor and the electric automobile.

REFERENCE SIGNS LIST

1 Permanent magnetic synchronous motor
6 Controller
10 Rotor position detecting unit (Rotor position detecting means)
12 Revolution number detecting unit (Revolution number detecting means)
14 Target current setting unit (Target current setting means)
22 Revolution number correcting unit (Feed-forward control means)
24 Phase voltage setting unit (Phase voltage setting means)
26 Target current phase correcting unit (Feed-forward control means)

The invention claimed is:

1. A motor control device configured to detect a rotor position of a permanent magnetic synchronous motor through sensorless control in a controller, the motor control device comprising:
   an inverter that is configured to detect an electric current flowing through a coil of the motor;
   a Pulse Width Modulation (PWM) signal generating unit that is configured to detect, via the inverter, a voltage applied to the coil of the motor;
   a rotor position detecting unit configured to detect:
      a current phase, a current peak value, and an induced voltage phase on the basis of the electric current detected by the inverter and the voltage detected by the PWM signal generating unit, and
      the rotor position on the basis of the detected current phase, the detected current peak value and the detected induced voltage phase;
   a target current phase setting unit configured to set a target current phase on the basis of the current phase detected by the rotor position detecting unit;
   a revolution number detecting unit that is configured to detect:
      a number of revolutions of the motor on the basis of the rotor position detected by the rotor position detecting unit, and
      a revolution number difference between the detected number of revolutions and a target number of revolutions instructed for the motor;
   a voltage peak value detecting unit that detects an applied voltage peak value of a voltage applied to the coil on the basis of the revolution number difference detected by the revolution number detecting unit;
   a phase voltage setting unit that is configured to set a target voltage on the basis of the target current phase set by the target current phase setting unit and the applied voltage peak value detected by the voltage peak value detecting unit; and
   a feed-forward control unit configured to:
      detect a change amount of any one of: the target voltage, the applied voltage peak value, and the revolution number difference, which are a monitoring target, and
      manipulate an operation amount of a predetermined operation target on the basis of a magnitude of the change amount, to correct the number of revolutions of the motor recognized by the controller.

2. The motor control device according to claim 1, wherein the predetermined operation target is the revolution number difference detected by the revolution number detecting unit.

3. The motor control device according to claim 1, wherein the operation target is the target current set by the target current phase setting unit.

4. The motor control device according to claim 2, wherein:
   the feed-forward control unit detects a change amount of the monitoring target,
   converts the change amount into an actual revolution number difference of the motor,
   filters the actual revolution number difference with a filter of a response time constant, which takes into account inertia of the rotor, to detect an added revolution number difference, and adds the added revolution number difference to the number of revolutions detected by the revolution number detecting unit.

* * * * *